United States Patent
Kwon et al.

(10) Patent No.: US 11,137,911 B2
(45) Date of Patent: *Oct. 5, 2021

(54) FAST RESTART OF APPLICATIONS USING SHARED MEMORY

(71) Applicant: SAP SE, Walldorf (DE)

(72) Inventors: Yong Sik Kwon, Seoul (KR); Jaeyun Noh, Seoul (KR); Juchang Lee, Seoul (KR); Ji Hoon Jang, Seoul (KR); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,122

(22) Filed: Jul. 3, 2019

(65) Prior Publication Data

US 2019/0324648 A1    Oct. 24, 2019

Related U.S. Application Data

(63) Continuation of application No. 14/242,642, filed on Apr. 1, 2014, now Pat. No. 10,444,990.

(Continued)

(51) Int. Cl.
*G06F 3/06* (2006.01)
*G06F 9/46* (2006.01)
(Continued)

(52) U.S. Cl.
CPC .......... *G06F 3/0604* (2013.01); *G06F 3/0655* (2013.01); *G06F 3/0673* (2013.01);
(Continued)

(58) Field of Classification Search
CPC .......... G06F 9/461; G06F 9/544; G06F 9/485; G06F 9/52; G06F 2003/0697;
(Continued)

(56) References Cited

U.S. PATENT DOCUMENTS

| | | | | |
|---|---|---|---|---|
| 6,523,066 B1 ‡ | 2/2003 | Montroy et al. | ......... | G06F 9/52 707/99 |
| 2007/0162779 A1 ‡ | 7/2007 | Downer | .................. | G06F 1/24 713/340 |
| 2015/0012706 A1 ‡ | 1/2015 | Blinick | .............. | G06F 12/0802 711/119 |

FOREIGN PATENT DOCUMENTS

| | | | | |
|---|---|---|---|---|
| CN | 103198122 | | 7/2013 | |
| CN | 103198122 A | ‡ | 7/2013 | ............. G06F 17/30 |

OTHER PUBLICATIONS

Wikipedia, "Shared memory," <http://en.wikipedia.org/wiki/Shared_memory>, 4 pages (accessed Jan. 23, 2014).

(Continued)

*Primary Examiner* — Masud K Khan
(74) *Attorney, Agent, or Firm* — Klarquist Sparkman, LLP

(57) ABSTRACT

Technologies are described for restarting an application while maintaining data in memory (e.g., using shared memory). For example, shared memory can be associated with an application. The shared memory can also be associated with a holder process to maintain the shared memory from the time the application stops to the time the application starts again. When the application starts, the shared memory can be associated with the started application. In addition, restart of in-memory databases can be provided using shared memory. For example, in-memory data can be maintained when a database process or database management system stops and starts (e.g., during a restart).

20 Claims, 6 Drawing Sheets

Related U.S. Application Data

(60) Provisional application No. 61/907,668, filed on Nov. 22, 2013.

(51) Int. Cl.
| | | |
|---|---|---|
| *G06F 9/54* | (2006.01) | |
| *G06F 9/44* | (2018.01) | |
| *G06F 9/48* | (2006.01) | |
| *G06F 9/52* | (2006.01) | |
| *G06F 13/16* | (2006.01) | |
| *G06F 9/445* | (2018.01) | |
| *G06F 9/4401* | (2018.01) | |

(52) U.S. Cl.
CPC ............ *G06F 9/461* (2013.01); *G06F 9/544* (2013.01); *G06F 9/4401* (2013.01); *G06F 9/442* (2013.01); *G06F 9/445* (2013.01); *G06F 9/485* (2013.01); *G06F 9/52* (2013.01); *G06F 13/1663* (2013.01); *G06F 2003/0697* (2013.01)

(58) Field of Classification Search
CPC ...... G06F 13/1663; G06F 9/442; G06F 9/445; G06F 9/4401
See application file for complete search history.

(56) References Cited

OTHER PUBLICATIONS

Chaim Bendelac, "SAP HANA Memory Usage Explained," SAP white paper, <http://www.saphana.com/docs/DOC-2299>, 12 pages (Dec. 2013).
Extended Search Report, European Patent Application No. 14003674.0, dated Mar. 24, 2015, 8 pages.
Laadan et al., "Transparent Checkpoint-Restart of Multiple Processes on Commodity Operating Systems", *Department of Computer Science Columbia University*, Jun. 15, 2007, pp. 1-14.
Kai Li et al., "Memory Coherence in Shared Virtual Memory Systems", *ACM Transactions on Computer Systems (TOCS)*, vol. 7, No. 4, Nov. 4, 1989, pp. 321-359.

‡ imported from a related application

FAST RESTART OF APPLICATIONS USING SHARED MEMORY

CROSS REFERENCE TO RELATED APPLICATIONS

This is a Continuation of U.S. patent application Ser. No. 14/242,642, filed Apr. 1, 2014, which claims the benefit of U.S. Provisional Patent Application No. 61/907,668, filed Nov. 22, 2013, both of which are hereby incorporated by reference in their entirety.

BACKGROUND

Typically an in-memory database management system (DBMS) stores data and change logs in non-volatile storage devices (e.g. hard disk drives (HDDs) or solid-state drives (SSDs)) to ensure durability of data and executes frequent operations on data in memory for better performance. When the database management system stops and restarts, data is loaded from non-volatile storage into memory.

Loading data from non-volatile storage into memory can be a time consuming process particularly if a large amount of data needs to be loaded into memory, which can be the case with an in-memory database management system. In addition, the database management system may be unavailable during the time it takes to load the data into memory.

Therefore, there exists ample opportunity for improvement in technologies related to memory management within database management systems or other applications.

DETAILED DESCRIPTION

Example 1—Overview

Figure 1:
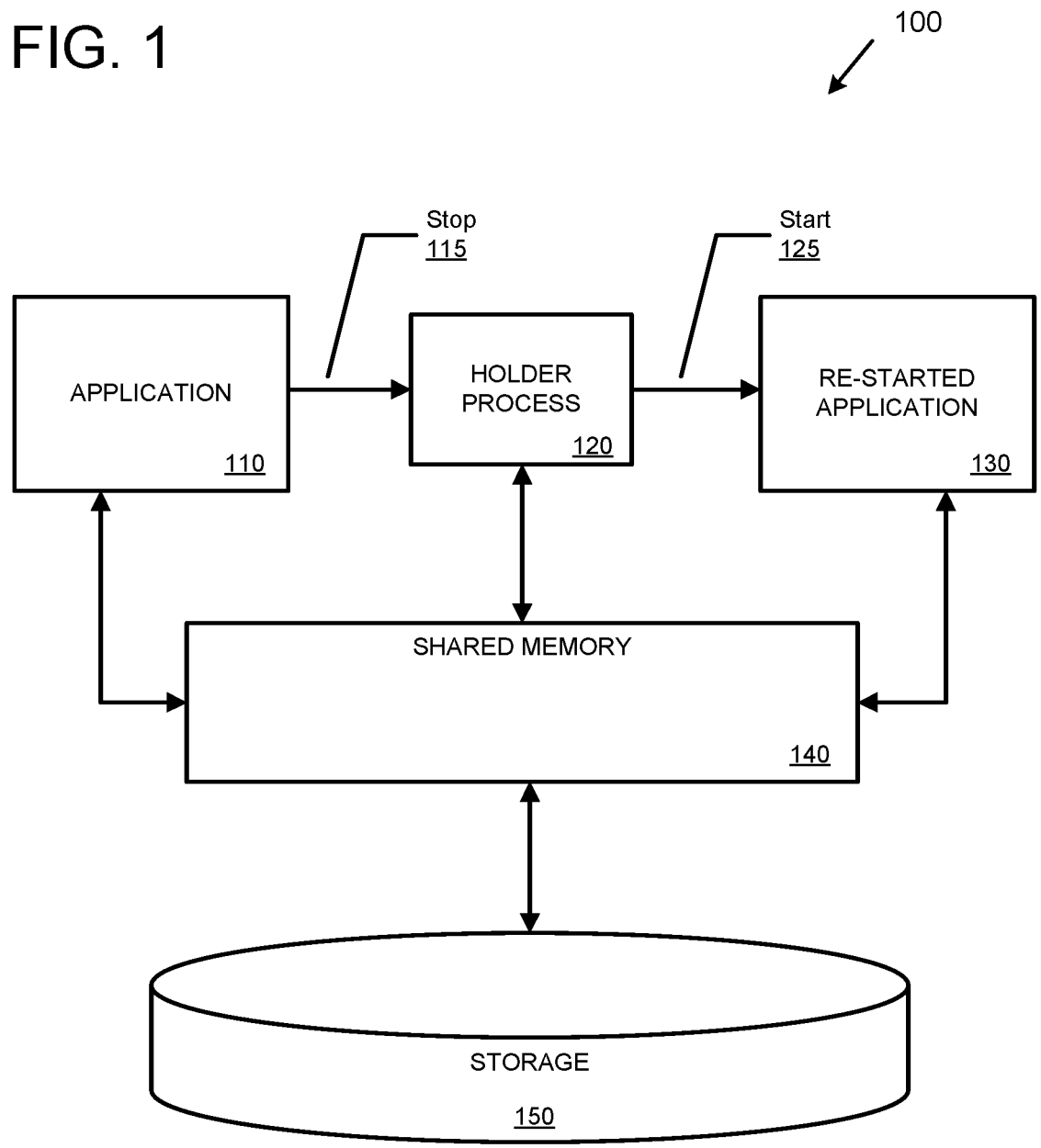
FIG. 1 is a diagram depicting an example environment for restarting applications using shared memory.

The following description is directed to techniques and solutions for restarting applications while maintaining data stored in primary memory. For example, in-memory data can be maintained when a database process or database management system stops and starts (e.g., during a restart). In some implementations, data is maintained in primary memory during application restart using shared memory. For example, the shared memory can be associated with a holder process so that the shared memory is not freed or released to the operating system when the application stops. When the application later starts, the shared memory can be associated with the application (e.g., re-associated) and the data stored within the shared memory utilized by the started application.

In some implementations, the shared memory is checked to determine whether it is usable by the application when it starts back up. For example, the data stored in the shared memory can be checked to determine whether it is needed by the application. The data stored in the shared memory can also be checked to determine whether it has been altered since the application stopped (e.g., by comparing checksums calculated when the application stops and when the application starts). The data stored in the shared memory can also be checked to determine whether it is consistent with data stored elsewhere (e.g., with data stored in storage as a backup). For example, checksums of the data in shared memory can be compared to checksums of the data in storage (e.g., upon application startup).

The technologies described herein can be applied to any type of application that needs to be restarted and that stores data in memory or that has to load data from storage into memory during startup or runtime. For example, an application can be restarted while maintaining its data in memory which can reduce or eliminate the time needed to re-load the data into memory when the application starts up again.

Typical a database management system (DBMS) stores data and change logs in non-volatile storage devices (e.g. hard disk drives (HDDs) or solid-state drives (SSDs)) to ensure durability of data and tries to minimize disk I/O for better performance. However, in an in-memory database management system, such as the HANA database (HANA is a database platform provided by SAP®), all data can be resident in memory (also called primary memory, primary storage, or random-access memory (RAM) as primary data storage with non-volatile storage devices being used as a backing store that keeps a backup image of in-memory data and change logs.

There are cases in which database processes (e.g., processes in a HANA database) should be stopped and started. For example, a database may need to be restarted in order to perform software upgrades or reconfiguration of storage devices. Because a DBMS can play a core role in enterprise database management, reduction of the time for making the database server ready for operation can be an important factor in shortening out-of-service time. Since the data resident in memory can disappear after the database is shutdown, data may need to be reloaded from backup data storage into memory when the database is restarted. The database will become fully active after data is loaded into memory when it starts up again.

Example 2—Shared Memory

In any of the examples herein, shared memory can be used to store data (e.g., any type of information usable by an application) for software applications (e.g., database application and/or other types of software applications). Shared memory refers to computer memory (also called primary memory, primary storage, or random-access memory (RAM)) that has been allocated (e.g., via an operating system) and can be shared between different applications within a computing environment (e.g., shared between different computer processes running on a computer server).

For example, a first application (e.g., running as a computer process) can allocate shared memory (e.g., one or more shared memory segments) from an operating system. Allocating the shared memory can associate the shared memory with the first application. The shared memory can be identified by memory identifier(s) (e.g., one or more shared memory segment identifiers). The shared memory can also be associated with one or more other applications and/or processes (e.g., allowing all applications and/or processes associated with the shared memory to access data stored in the shared memory).

Shared memory can be associated with different applications and/or processes at different times. For example, shared memory can be associated with a first computer process and the same shared memory can later be associated with a second computer process. An application and/or process can also be dis-associated with shared memory (e.g., when the application and/or process shuts down).

Example 3—Re-Using Shared Memory

In any of the examples herein, shared memory can be re-used by an application after the application has been restarted. For example, when an application shuts down (stops), the shared memory associated with the application can be retained within the computing environment (e.g., not released or freed to the operating system). When the application is started at a later time (e.g., as part of an application restart that involves stopping the application and subsequently starting the application), the application can be re-associated with the shared memory. In this manner, information can be maintained in shared memory between application shut-down and start-up (e.g., between the time an application shuts down and later starts up).

In this way, the data stored within shared memory can be maintained in the shared memory (e.g., not released or freed to the operating system) while the application is not running (e.g., during the restart operation).

An application can use shared memory to store data during runtime. When the application shuts down, the data in the shared memory can be maintained in the shared memory while the application process restarts.

Shared memory can also be allocated at shut down time. For example, an application may store data in memory that is not shared. When the application shuts down, the application (or another application or process) can allocate shared memory, copy or move the data from the non-shared memory of the application to the shared memory, and maintain the data in shared memory while the application restarts.

Example 4—Holder Process

In any of the examples herein, shared memory can be maintained by a holder process during application restart. For example, an application can hand off shared memory to a holder process between application stop time and application start time.

In some implementations, a holder process is associated with shared memory while an application is running (e.g., during application startup or at another time while the application is running). For example, when shared memory is associated with an application it can also be associated with the holder process (e.g., by passing shared memory identifiers to the holder process).

In some implementations, a holder process is associated with shared memory during application shut down. For example, at a time when an application is shutting down (e.g., when an application receives an instruction to shut down) the application can hand off some or all of the shared memory currently associated with the application to the holder process (e.g., by passing shared memory identifiers to the holder process).

In some implementations, a holder process is created during application shut down. For example, a running application that is shutting down can create a holder process, associated shared memory with the holder process, and complete the shutdown of the application.

The holder process can be a dedicated holder process that is dedicated to holding shared memory for an application between the time the application stops and starts.

Example 5—Shared Memory for Database Applications

In any of the examples herein, shared memory for a database application can be maintained (e.g., by a holder process). For example an in-memory database application (e.g., running as one or more computer processes) can use shared memory (e.g., one or more shared memory segments) for storing database information in primary memory during runtime of the database application (e.g., while the database application is running on one or more computer servers). When the database application stops (e.g., as part of a restart), the shared memory can be maintained (e.g., not released or freed). For example, the shared memory can be maintained by a holder process. When the database application later starts (e.g., as part of the restart), the shared memory can be re-associated with the database application.

A database application, such as an in-memory database application, can store a large amount of data in primary memory (e.g., most or all of the data that the application uses). If the database application has to load data from storage (e.g., hard disks or solid-state drives) when the database application restarts, performance can be negatively affected. For example, access times for storage can be orders of magnitude slower than primary memory. By maintaining data in shared memory during a database application restart, the amount of time otherwise needed to load data from storage back into primary memory can be significantly reduced.

In some implementations, an in-memory database application can specify certain types of information to maintain in shared memory (e.g., to maintain in shared memory during database restarts). For example, data that is to be maintained in shared memory can be specified by database table (e.g., on a table-by-table basis), by row-store (e.g., based on partitions of data within the row-store), by column-store (e.g., on a column-by-column basis), and/or based on other criteria for deciding which data to maintain in shared memory.

Example 6—Checking Whether Shared Memory is Usable

In any of the examples herein, shared memory can be checked to determine whether it is usable by a started application. For example, in some situations the started application may not be able to use the data stored in the shared memory. Such situations can occur, for example, when the data in the shared memory is overwritten, corrupted, modified, etc.

In some implementations, checking whether the shared memory is usable includes checking whether the shared memory is needed by the application that is being started. This can happen, for example, with a database application where the database application is being started using database data other than that stored in the shared memory (e.g., when using a different or older snapshot of the database data). In such a situation, the data in the shared memory is not needed by the application and it can be discarded. For example, the shared memory can be loaded with other data from storage (e.g., an older snapshot) or the shared memory can be freed and returned to the operating system.

In some implementations, checking whether the shared memory is usable includes checking whether the shared memory has been overwritten (e.g., during the time it was held by a holder process). If the application being started determines that the data in the shared memory has been overwritten, or otherwise altered, the application can reload data from storage (e.g., for all data within the shared memory or only for portions that have been overwritten or altered). In some implementations, when the application is shut down checksums are created for the data in the shared memory (e.g., created in parallel using multiple processors and/or processing cores). The checksums can then be used when the application starts again to check whether the data in the shared memory has been modified. For example, new checksums can be created from the data in the shared memory when the application starts (e.g., created in parallel using multiple processors and/or processing cores) and compared to the original checksums that were created when the application shut down. If the checksums match, then the data can be viewed as unmodified (e.g., with a level of confidence that depends on the specific checksum technology used). Checksums can be applied to the data as a whole or to specific portions of the data stored in the shared memory (e.g., to data within each shared memory segment or each shared memory page). The checksums that are calculated at shut down can be saved for use later when the application starts again (e.g., stored within the shared memory, stored in a file, or stored in other memory or storage, such as saved in memory by the holder process).

In some implementations, consistency of database data stored within shared memory can be checked using log identifier information. For example, an in-memory database can store information indicating the last change log saved at shut down time (e.g., a change log identifier stored in storage). When the database application starts again, the last change log identifier from the storage can be compared to the last change log identifier from the shared memory to see if they are the same (indicating that the data in shared memory has not changed and represents the same data as stored in storage).

Checking whether shared memory is usable by an application being started can be performed on the data in the shared memory as a whole and/or on specific portions of the data in the shared memory. For example pages and/or segments of shared memory can be checked and only those that have been modified can be reloaded from storage.

Example 7—Environment for Restarting Applications Using Shared Memory

In any of the examples herein, an environment can be provided for restarting applications using shared memory. For example, the environment can be an environment for running database applications (e.g., an in-memory database management system) and/or other types of computer applications. The environment can comprise various types of computing resources (e.g., computer servers, storage devices, etc.).

FIG. 1 is a diagram depicting an example environment 100 for restarting applications using shared memory. The environment 100 can be implemented on one or more computing devices (e.g., one or more computer servers).

As depicted in the environment 100, an application 110 is running. For example, the application 110 can be executed at runtime by a computer process (e.g., a computer process executing an instance of the application 110 within the computing environment 100). The application 110 is associated with shared memory 140 (e.g., memory that has been allocated by the operating system and associated with the application 110). In some implementations, the shared memory 140 is associated with storage 150. For example, the storage 150 can be used to persistently store some or all data that is present in the shared memory 140 (e.g., as a backup image of the data in shared memory 140).

The environment 100 illustrates how an application restart can be performed. First, the application 110 stops (shuts down) as depicted at 115. During shut down, the shared memory 140 is associated with a holder process 120. For example, the application 110 can hand off information identifying the shared memory 140 to the holder process 120 (e.g., shared memory identifiers). Alternatively, the shared memory 140 can be associated with the holder process 120 at another time (e.g., during runtime of the application 110 or when the application 110 starts). In some implementations, the holder process 120 is created during shut down of the application 110.

Second, the application 110 starts, as depicted at 125. During startup, the re-started application 130 is associated (e.g., re-associated) with the shared memory 140. For example, the holder process 120 can hand off the shared memory 140 to the re-started application 130 (e.g., pass shared memory identifiers to the re-started application 130 so that the shared memory 140 can be re-associated with the re-started application 130).

In some implementations, shared memory 140 is checked to determine if it is usable by the re-started application 130 (e.g., to determine whether it should be re-associated with the re-started application 130). In some situations, the data in the shared memory 140 will not be usable by the re-started application 130. For example, the re-started application 130 may use different configuration options (e.g., options to run with data different from that currently stored in the shared memory 140). As another example, the data in the shared memory 140 may have been altered between the time the application 110 shut down (at 115) and later started (at 125).

Figure 2:
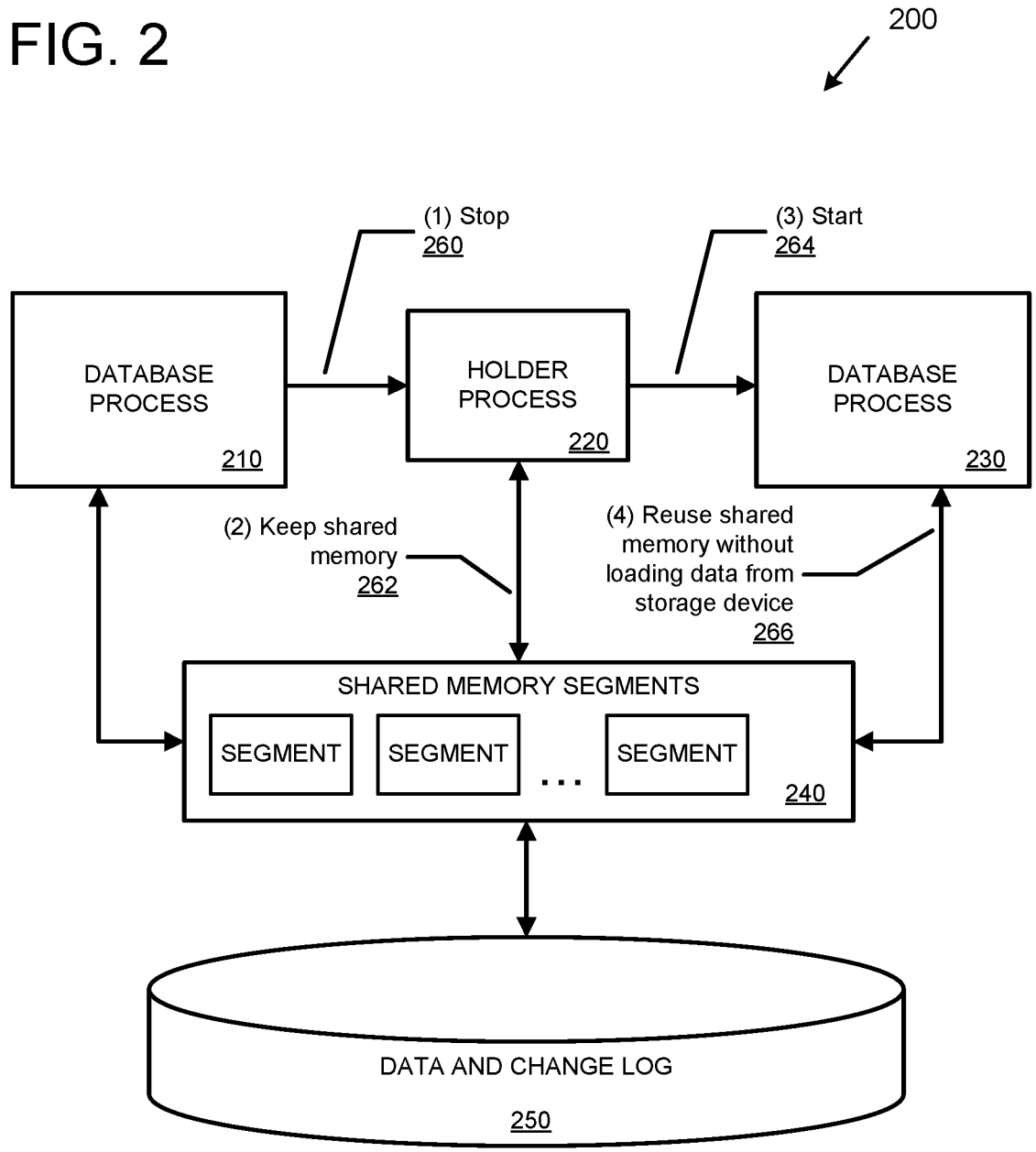
FIG. 2 is a diagram depicting an example environment for restarting database applications using shared memory.

FIG. 2 is a diagram depicting an example environment 200 for restarting database applications using shared memory. The environment 200 can be implemented on one or more computing devices (e.g., one or more computer servers).

As depicted in the environment 200, a database process 210 is running (e.g., to execute an in-memory DBMS). The database process 210 is associated with one or more shared memory segments 240 (e.g., shared memory segments that have been allocated by the operating system and associated with the database process 210). In some implementations, the shared memory segments 240 are associated with storage 250 for data and change logs. For example, the storage 250 can be used to persistently store some or all data and/or change logs that are present in the shared memory segments 240 (e.g., as a backup image of the data and/or change logs in shared memory segments 240).

The environment 200 illustrates how a database application (e.g., in-memory database application) can be restarted while maintaining shared memory so that the database application does not have to reload data from storage after the restart. First, the database process 210 is stopped (shut down), as depicted at 260. Upon shutdown (e.g., during a sequence of operations performed by the database process 210 after receiving an instruction to stop), a holder process 220 is associated with the shared memory segments 240, as depicted at 262. Alternatively, the holder process 220 can be associated with the shared memory segments 240 at another time (e.g., when the database process 210 is running, when the database process 210 first starts, or at another time). In some implementations, the holder process 220 is created (e.g., by the database process 210) during the shutdown.

Later, the database process 230 starts, as depicted at 264. The database process 230 (a second running instance of the database application) is a different computer process than the database process 210 (a first running instance of the database application). During startup, the database process 230 is associated with the shared memory segments 240 being held by the holder process 220, as depicted at 266. For example, the holder process 220 can hand off the shared memory segments 240 to the database process 230 (e.g., pass shared memory segment identifiers to the database process 230 so that the shared memory segments 240 can be re-associated with the database process 230).

In some implementations, the shared memory segments 240 are checked to determine if they are usable by the database process 230 (e.g., to determine whether they should be associated with the database process 230). In some situations, the data in the shared memory segments 240 will not be usable by the database process 230. For example, the database process 230 may use different configuration options (e.g., options to run with data different from that currently stored in the shared memory segments 240). As another example, the data in the shared memory segments 240 may have been altered between the time the database process 210 shut down (as depicted at 260) and later started (as depicted at 264).

The environment 200 can provide advantages when restarting database applications, such as in-memory database applications. For example, an in-memory database application typically stores a large amount of data (e.g., important or frequently-used data) in memory (e.g., to avoid having to retrieve data from slower storage, such as hard drive storage). When a database application needs to be restarted (e.g., to perform a software upgrade, to reconfigure settings, for maintenance purposes, or for another reason), the memory used by the database application can be maintained with its stored data instead of freeing the memory for other uses (e.g., use by other applications or by the operating system). When the database application is started again, the memory can be associated with the re-started database application with the data intact. This can significantly reduce the startup time of the database application which would otherwise have to load data from storage, which can be a time consuming process.

Example 8—Methods for Restarting Applications Using Shared Memory

In any of the examples herein, methods can be provided for restarting applications using shared memory. For example, shared memory used by an application can be maintained while the application is restarted (e.g., the data stored in the shared memory can remain intact and be available to the application after it has restarted). In this way, data stored in shared memory can remain intact (e.g., not freed or released to the operating system for use by other applications) and available to the application after it has restarted. This can reduce the time needed for the application to restart by not having to reload data from storage (e.g., storage devices, such as hard disks and solid-state drives) which can be a time consuming process particularly if a large amount of data needs to be loaded into memory.

Figure 3:
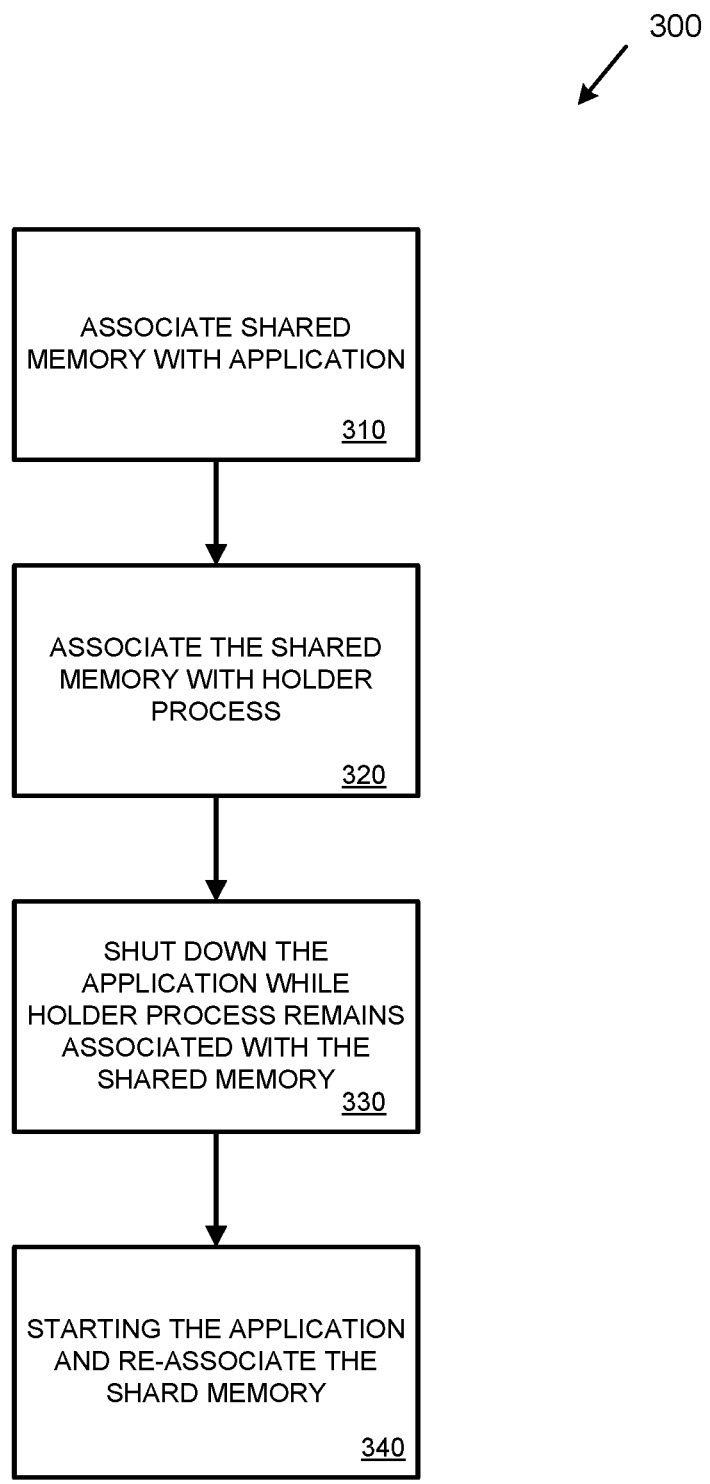
FIG. 3 is a flowchart of an example method for restarting applications using shared memory.

FIG. 3 is a flowchart of an example method 300 for restarting applications using shared memory. At 310, shared memory is associated with an application. For example, the shared memory can be associated with the application when the application first starts and/or at another time while the application is running (e.g., by allocating the shared memory from the operating system). Associating the shared memory with the application can comprise associating shared memory identifiers (e.g., shared memory segment identifiers) with the application (e.g., with a computing process executing an instance of the application).

At 320, the shared memory is also associated with a holder process. The shared memory can be associated with the holder process at various times, such as during runtime of the application and/or when the application is shutting down.

At 330, the application is shut down. While the application is shut down, the holder process remains associated with the shared memory. By remaining associated with the shared memory, the data stored in the shared memory can remain in the shared memory instead of being freed or returned to the operating system. In some implementations, the holder process is associated with the shared memory while the application is shutting down. In some implementations, the holder process is created and associated with the shared memory while the application is shutting down.

At 340, the application is started (at some time after the application was shut down at 330). The started application (e.g., the re-started application) is re-associated with the shared memory. For example, the started application can re-associated with the shared memory by receiving shared memory identifiers from the holder process. In some implementations, when the application is started, it detects or identifies the holder process (e.g., using a process name or a process identifier for the holder process).

In some implementations, starting the application at 340 comprises checking whether the shared memory is usable by the started application. If the shared memory is usable by the started application (e.g., only if the shared memory is usable by the started application), the shared memory is re-associated with the started application. For example, checking whether the shared memory is usable can comprise checking whether the started application is configured to use the data stored in the shared memory and/or checking whether the data in the shared memory has been altered since the application was shut down.

Figure 4:
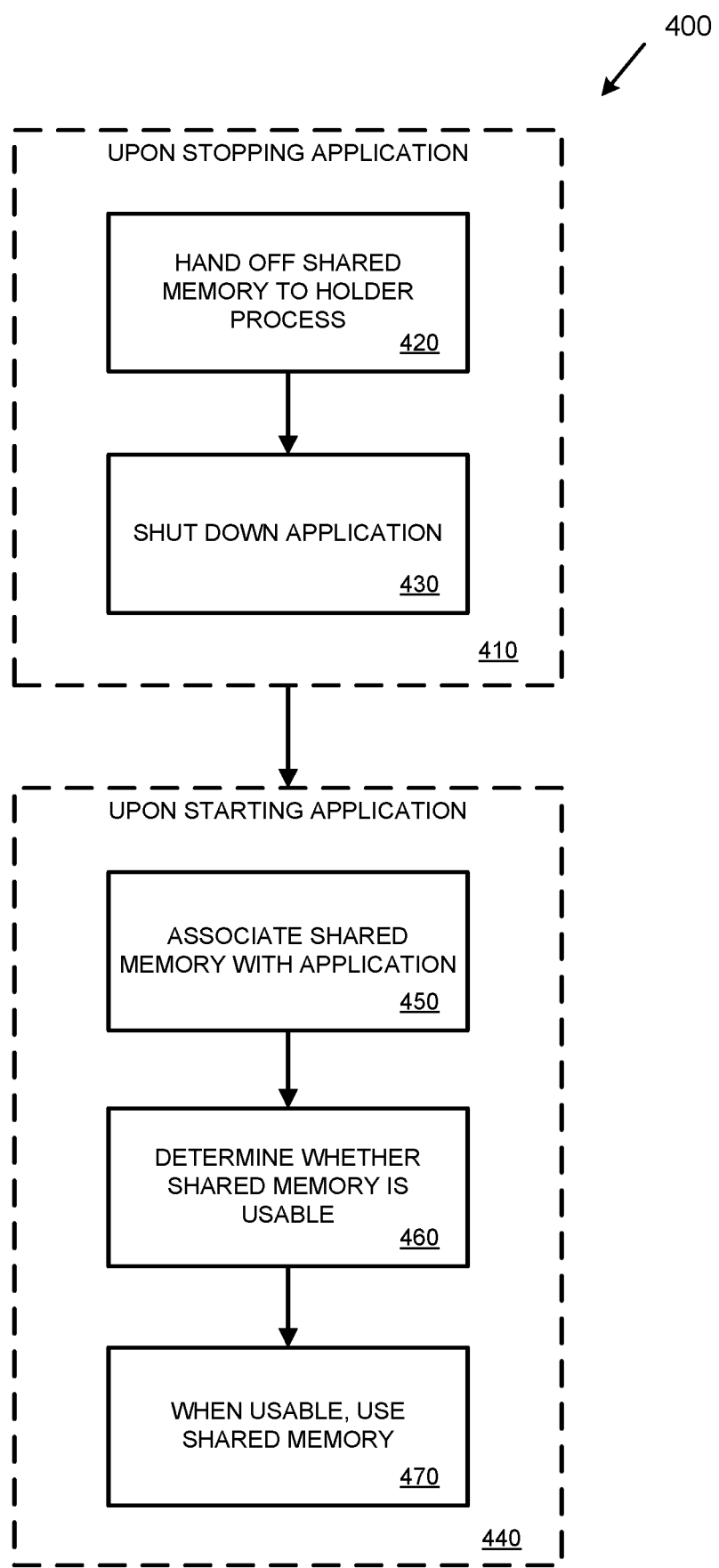
FIG. 4 is a flowchart of an example method for restarting applications using shared memory.

FIG. 4 is a flowchart of an example method 400 for stopping and starting applications (e.g., database application) using shared memory. At 410, a number of operations are performed upon stopping an application. For example, the operations can be performed by a computer process executing the application upon the computer process receiving a command to shut down.

At 420, shared memory used by the application (e.g., some or all of the shared memory associated with the application) is handed off to a holder process. For example, the application can pass shared memory identifiers to the holder process so that the shared memory is not freed or released after the application shuts down. At 430, the application shuts down (e.g., the application process stops and the application is no longer running).

At 440, a number of operations are performed upon starting the application. For example, the operations can be performed by a new computer process that is created to run the application.

At 450, the shared memory is associated with started application. For example, the shared memory can be passed to the started application (e.g., to a computer process executing the started application) by the holder process. In some implementations, the started application detects or identifies the holder process (e.g., using a process name or a process identifier for the holder process).

At 460, a determination is made as to whether the shared memory that has been associated with the started application is usable. The determination can comprise checking whether the data stored with the shared memory is needed by the started application, checking whether the data stored within the shared memory has changed (e.g., using checksums), and/or based on other types of checking.

At 470, when the determination (at 460) indicates that the shared memory is usable by the started application, it is used. Otherwise, if the shared memory is not usable (as determined at 460), the started application can perform other operations that do not use the data in the shared memory (e.g., the started application can free or clear the shared memory or load other data into the shared memory).

Figure 5:
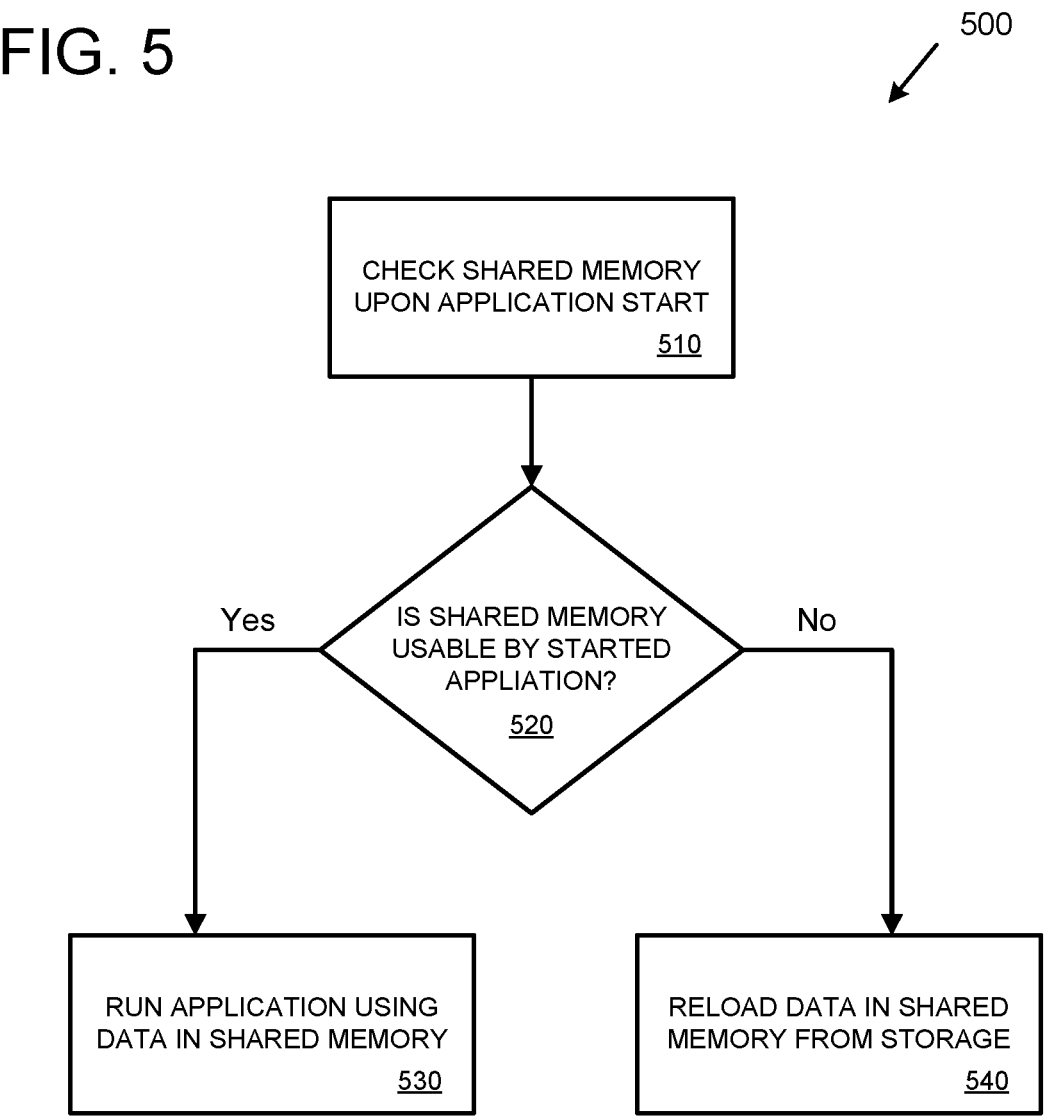
FIG. 5 is a flowchart of an example method for checking whether shared memory is usable.

FIG. 5 is a flowchart of an example method 500 for checking whether shared memory is usable by a restarted application. For example, the method 500 can be performed as part of an application restart in which the started application has received shared memory from a holder process and is checking to determine whether the shared memory is usable (e.g., whether the started application can use the data within the shared memory).

At 510, an application, upon application start, checks shared memory. For example, the application can check the data stored in the shared memory.

At 520, the shared memory is checked to determine whether it is usable by the started application. For example, the check can include checking a version of the data stored in the shared memory (e.g., a snapshot version or timestamp for a database application). The checking can also include checking whether the data in the shared memory has been modified while it was being held by the holder process since the application last shut down (e.g., by comparing checksum values). The checking can also include checking whether the data in the shared memory is consistent with corresponding data in storage (e.g., by comparing checksum values).

If the shared memory is usable, then the method proceeds to 530 where the started application runs using the data in the shared memory. If, however, the shared memory is not usable, then the method proceeds to 540 where the data in the shared memory is reloaded from storage (e.g., the shared memory can be erased or overwritten with the data loaded from storage).

Example 9—In-Memory Reuse Implementations

In any of the examples herein, technologies can be provided to reuse in-memory data (e.g., data stored in shared memory) at the next database process start to reduce the time needed for restoring data in memory. To make in-memory data reusable, data is stored in memory which should not be returned to the operating system at the termination of the database process and, upon the next startup of the database process, the memory will be reused. In addition, to check consistency between data in memory and in storage, validation procedures can be added. When the DBMS encounters any problem in reusing memory, it can revert to the traditional start scheme that loads data from non-volatile storage devices to memory.

In this way, in-memory data used by the database can be maintained in-memory after the database shuts down (e.g., not released to a free memory pool or re-assigned to another process). When the database starts back up again (e.g., upon the database being restarted), the in-memory database can still be available and used (e.g., re-associated with the database process).

In some implementations, the database process (e.g., an in-memory database process, such as a HANA database process) can store in memory data in shared memory which is provided by modern operating systems.

The following method describes an example implementation for performing a restart of a DBMS while retaining in-memory data:
1. When DBMS stops, the database process will hand over the shared memory containing data to a dedicated shared-memory holder process (SHM) which will keep the shared memory until the next start of database process.
2. When DBMS starts, it detects the shared-memory holder process and takes over the shared memory. If the detection fails, the database can start with the data in storage device.
3. In addition, the database process checks if the shared memory has been changed since last stop.
4. In addition, the database process checks if information in storage device is consistent with the data in shared memory or not (e.g., by comparing change log identifiers). The database process can also check whether the information in the shared memory has been altered by comparing checksum values which were computed and stored at system shutdown with calculated checksum values of data in shared memory at startup. Multiple CPUs can be used in parallel to reduce checksum calculation time.
5. When any inconsistencies are detected by step 4 or step 5, the database process abandons the shared memory and starts with the data in non-volatile storage device.

The technologies described herein can provide advantages over existing techniques. For example, an advantage of the technologies described herein is that data transfer from non-volatile storage device to memory can be reduced or eliminated. Without the technologies described herein, existing techniques can be limited to the speed of non-volatile storage devices.

In an example implementation, a database environment is provided comprising one or more computer servers operating one or more databases. The database environment is configured to perform operations for restart of an in-memory database using shared memory In another example implementation, a method, implemented at least in part by one or more computing devices, is provided for restart of in-memory databases using shared memory. The method comprises, at a time of stopping a database, associating memory used by the database with a memory holder process and, at a time of starting the database, re-associating the memory from the memory holder process back to the database.

Example 10—Computing Systems

Figure 6:
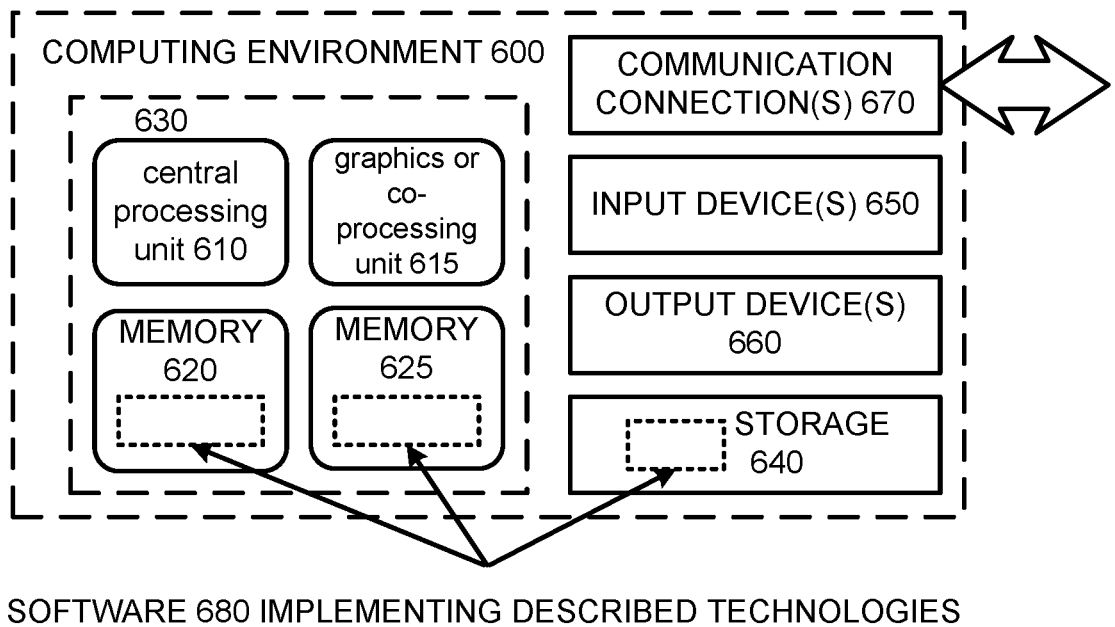
FIG. 6 is a diagram of an example computing system in which some described embodiments can be implemented.

FIG. 6 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 7:
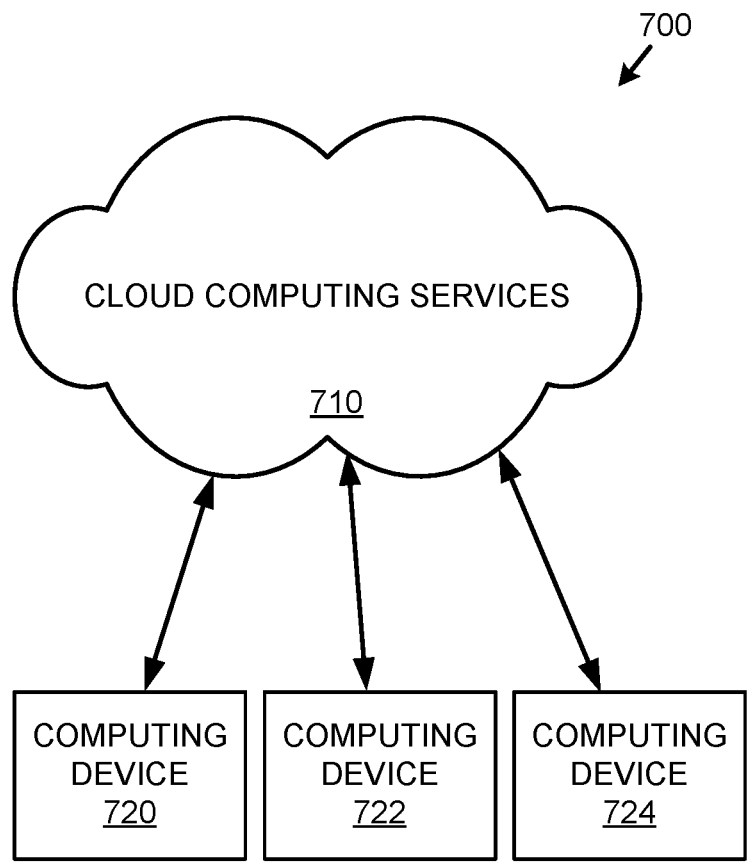
FIG. 7 is an example cloud computing environment that can be used in conjunction with the technologies described herein.

FIG. 7 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections (e.g., 670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a computing device, the method comprising:
    associating shared memory with an application;
    creating a holder process by the application;
    associating the shared memory with the holder process by the application;
    shutting down the application, wherein the holder process remains associated with the shared memory after the application has shut down;
    after the application has been shut down, restarting the application; and
    associating the shared memory with the restarted application by the holder process.

2. The method of claim 1 wherein the holder process comprises a dedicated shared memory holder process that is dedicated to holding the shared memory for the application during the restarting of the application.

3. The method of claim 1 wherein the application is implemented by a first computer process and the restarted application is implemented by a second computer process.

4. The method of claim 1 wherein associating the shared memory with the holder process occurs when shutting down the application.

5. The method of claim 1, wherein the shared memory is associated with the application by an operating system.

6. The method of claim 1, wherein the shared memory comprises one or more shared memory segments, and wherein associating the shared memory with the holder process comprises:
    handing off shared memory segment identifiers identifying the one or more shared memory segments to the holder process.

7. The method of claim 1, further comprising:
    checking whether the shared memory is usable by the restarted application.

8. The method of claim 7, wherein checking whether the shared memory is usable by the restarted application comprises checking whether the shared memory has been overwritten.

9. The method of claim 7 wherein checking whether the shared memory is usable by the restarted application comprises:
    checking whether the shared memory has been modified since the application was shut down.

10. The method of claim 1, further comprising:
    at a time of shutting down the application:
        creating one or more checksums for the shared memory; and
        saving the one or more checksums in a memory or storage; and
    at a time of restarting the application:
        creating one or more new checksums for the shared memory; and
        comparing the one or more checksums with the one or more new checksums to determine whether data stored within the shared memory has been altered.

11. The method of claim 10, further comprising:
    determining that the data stored within the shared memory has been altered;
    discarding the data in the shared memory; and
    loading data from storage for use with the restarted application.

12. A computer-readable storage medium storing computer-executable instructions for causing a computing device to perform operations, the operations comprising:
    associating shared memory with an application;
    creating a holder process by the application;
    associating the shared memory with the holder process;
    stopping the application, wherein the holder process remains associated with the shared memory while the application is stopped;
    restarting the application; and associating the shared memory with the restarted application by the holder process.

13. The computer-readable storage medium of claim 12, wherein the holder process is a dedicated shared memory holder process that is dedicated to holding the shared memory for the application during the restarting of the application.

14. The computer-readable storage medium of claim 12, wherein the shared memory is associated with the application by an operating system.

15. The computer-readable storage medium of claim 12, wherein the shared memory comprises one or more shared memory segments, and wherein associating the shared memory, by the application, with the holder process comprises:
   handing off shared memory segment identifiers identifying the one or more shared memory segments to the holder process, wherein the shared memory segment identifiers are associated with the holder process after the handing off the shared memory segment identifiers.

16. The computer-readable storage medium of claim 12, wherein the shared memory comprises one or more shared memory segments, and wherein associating the shared memory with the application by the holder process comprises:
   receiving, by the application, shared memory segment identifiers identifying the one or more shared memory segments from the holder process; and
   associating the received shared memory segment identifiers with the application.

17. The computer-readable storage medium of claim 12, wherein the operations further comprise:
   determining whether the shared memory is usable by the application; and
   upon determining that the shared memory is usable, stopping the holder process and running the application using the shared memory.

18. The computer-readable storage medium of claim 17, wherein determining whether the shared memory is usable by the application comprises:
   validating the shared memory using, at least in part, one or more checksums to determine whether the shared memory has been modified since the application was stopped.

19. The computer-readable storage medium of claim 12, wherein the operations further comprise:
   upon stopping the application:
      creating one or more checksums for the shared memory, and
      saving the one or more checksums in a memory or storage; and
   upon restarting the application:
      creating one or more new checksums for the shared memory, and
      comparing the one or more checksums with the one or more new checksums to determine whether data stored within the shared memory has been altered.

20. A computing device configured to perform operations, the operations comprising:
   associating shared memory with an application;
   creating a holder process by the application;
   associating the shared memory with the holder process;
   shutting down the application, wherein the holder process remains associated with the shared memory after the application has shut down;
   after the application has been shut down, restarting the application; and associating the shared memory, by the holder process, with the restarted application.

* * * * *